United States Patent

[11] 3,620,761

| [72] | Inventor | Ferdinand E. Spring, Jr. |
|---|---|---|
|  |  | St. Louis, Mo. |
| [21] | Appl. No. | 778,477 |
| [22] | Filed | Nov. 25, 1968 |
| [45] | Patented | Nov. 16, 1971 |
| [73] | Assignee | Ralston Purina Company |
|  |  | St. Louis, Mo. |

[54] COOK-IN-THE-BOWL CEREAL
8 Claims, 1 Drawing Fig.

| [52] | U.S. Cl. | 99/80, 99/83 |
|---|---|---|
| [51] | Int. Cl. | A23l 1/10 |
| [50] | Field of Search | 99/80, 80 PS, 83 |

[56] References Cited
UNITED STATES PATENTS

| 2,864,702 | 12/1958 | Murray et al. | 99/80 |
|---|---|---|---|
| 2,898,210 | 8/1959 | Dale et al. | 99/80 |
| 2,928,743 | 3/1960 | Rutgers | 99/80 |
| 2,930,697 | 3/1960 | Miller | 99/80 |
| 3,241,978 | 3/1966 | Hreschak | 99/80 |

*Primary Examiner*—Raymond N. Jones
*Attorneys*—Robert W. Brukardt and Edward H. Renner ABSTRACT: A process of producing a cook-in-the-bowl type of hot breakfast cereal is disclosed. The process involves selecting a specific milled fraction of grain and flaking the grain to a thickness of 0.007 to 0.008 inch. The thin flakes are capable of rehydrating rapidly in boiling water to produce a hot breakfast cereal of the instant or cook-in-the-bowl type.

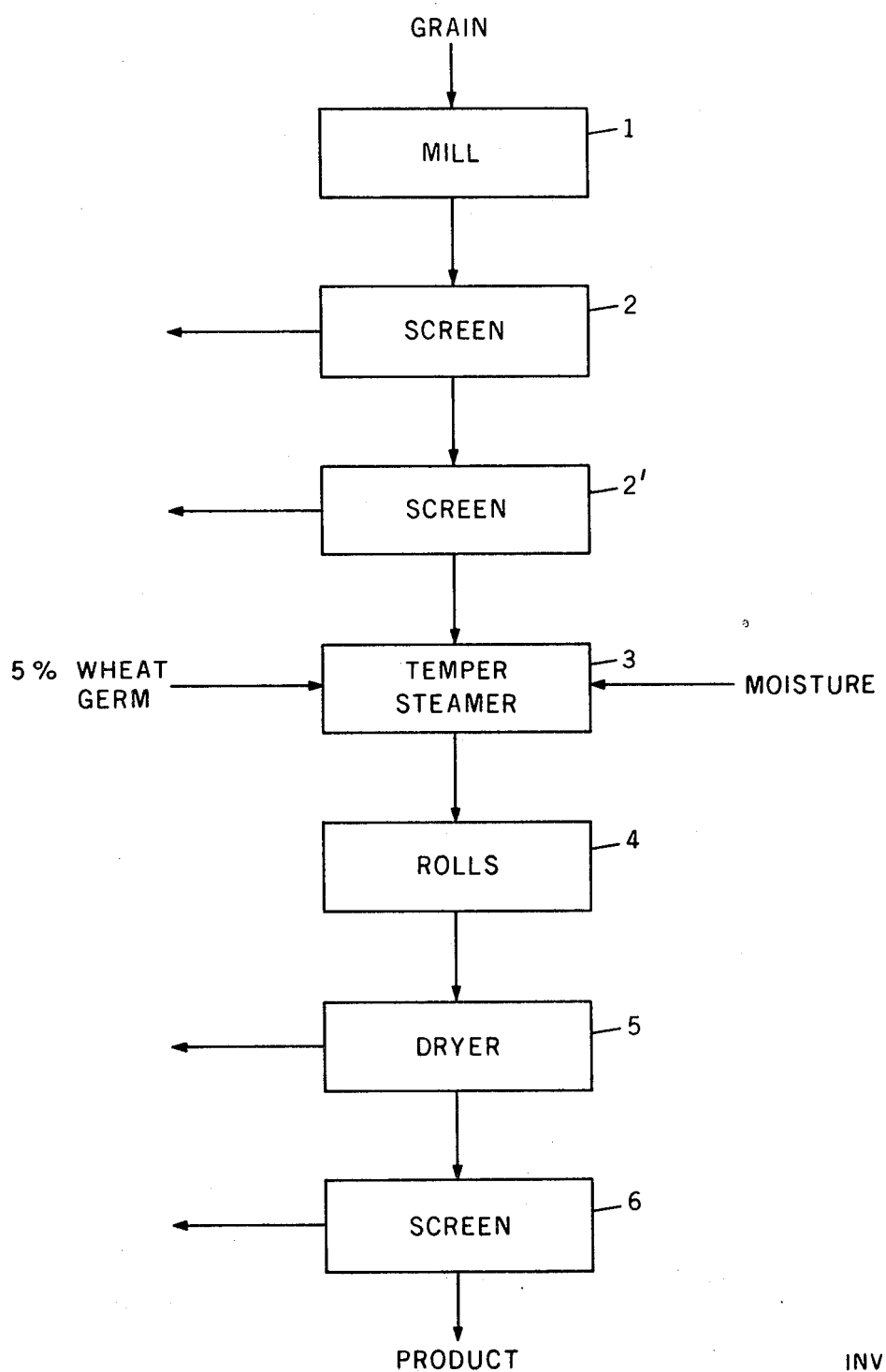

COOK-IN-THE-BOWL CEREAL

It is known in the art to produce quick-cooking hot breakfast cereals from grain. The known processes usually employ steaming the grain particles at elevated temperatures and pressures and flaking the grain particles to form a cereal product that can be prepared for use by the consumer by boiling in water from 1 to 2 minutes. Examples of this type are taught by U.S. Pat. Nos. 2,332,914 and 3,241,978. It is also known to incorporate edible gums in conventional hot cereal products to decrease the time required to prepare them for consumption or to provide an instant or cook-in-the-bowl-type cereal. U.S. Pat. Nos. 2,890,118 and 2,999,018 disclose cereal products of this type.

This invention provides a process for producing a novel cook-in-the-bowl or instant-type cereal which does not require edible gums to decrease the time of preparation and which can be prepared in a cereal bowl by adding boiling water. The product has the distinct advantage of not requiring an additive material to decrease the time required for preparation. Added materials dilute the basic nutrient material and do not add any additional nutrient properties to the cereal product. The process of this invention produces a cook-in-the-bowl type of cereal which is undiluted and retains the nutritional properties of the grain intact. The process can be accomplished in an economical continuous plant-scale operation. The product of this invention is a novel cook-in-the-bowl cereal which has superior taste and texture, and the nutritional properties of the undiluted grain. When cooked in a cereal bowl by adding boiling water the product provides a hot breakfast cereal which is prepared instantly and which has a taste and texture equivalent or superior to slow-cooking hot cereal.

The invention involves selecting a particular milled fraction of grain and flaking the grain to a very thin flake of 0.007 to 0.008 inch thickness. Wheat, preferably hard red winter wheat, is milled to particle size such that at least 90 percent of the milled grain passes a No. 12 Tyler mesh screen and less than 10 percent passes a No. 42 Tyler mesh screen. The milled fraction is tempered to a moisture content of 15 to 16 percent and a temperature of 185° to 220° F. before being flaked. The tempered grain is then passed through a set of flaking rolls having a slight speed differential and flaked to 0.007 to 0.008 inch. The flaked grain is then dried to a moisture content of 8 to 9 percent to provide a dried, rapidly rehydrating flake.

It is critical that the thickness of the flake be controlled to produce a flake of 0.007 to 0.008 inch thickness. At thicknesses above 0.008 the flake will not rehydrate satisfactorily to produce a cook-in-the-bowl product. The cereal will have a mealy, uncooked mouth feel and an off flavor. At thicknesses below 0.007 the flakes are too fragile and readily break up to a fine dust or powder which rehydrates to a paste or mesh. Control of the moisture content and temperature of the grain fraction is essential to producing a flake of the desired thickness.

A process of producing a cook-in-the-bowl cereal product is illustrated in the drawing. Hard, red winter wheat having a moisture content of about 10 percent by weight is broken on a conventional roll mill 1 and screened through a series of screens illustrated by 2, 2' to select a milled fraction with about 80 percent of the particles having a particle size greater than No. 42 Tyler mesh. The grain fraction used in the process shown by the drawings is preferably selected to conform to the screen analysis shown by table I.

TABLE I

| Tyler Mesh Screen Size | Percent of Particles Retained on Screen |
| --- | --- |
| #8 | 0 |
| #12 | 8 |
| #20 | 55 |
| #28 | 22 |
| #42 | 10 |
| pan | 5 |

After the grain is screened, vitamins or other nutritional supplements may be added to the grain. Normally, 5 percent by weight of wheat germ is added to the screened grain to increase the nutritional value of the final product. At this point in the operation the screened fraction normally has a moisture content of 8 to 9 percent. This is too low for proper rolling. The fraction is conducted from the screening operation to an atmospheric screw-tempering chamber 3 where steam and water are injected into the ground grain. The grain is retained in the tempering chamber 3 for about 5 minutes to allow the grain to absorb moisture and heat. Normally the grain will issue from the tempering chamber 3 with a moisture content of 12 to 16 percent by weight and will be at a temperature of 185° to 220° F. The moisture level must be carefully controlled to enable the grain to be rolled to the proper thickness. To provide a rapidly rehydrating product the rolled flakes must be very thin and durable. Preferably the temperature of the grain should be controlled to the range of 190° to 210° F. The tempered grain is fed through a pair of 14×36 inch water-cooled 30 horsepower Lauhoff rolls 4 set to flake the grain to between 0.007 and 0.008 inch thickness. The flaked grain is collected and dried on a dryer 5 to a moisture content of 8 to 9 percent by weight to provide a product which rehydrates rapidly when mixed with boiling water. During drying the flour and fine particles of grain flakes are carried off in the drying air and trapped in a dust collector. The dried product is then sifted on screen 6 to remove any lumps which have formed on the rolls 4. The screened product can then be packaged and sold or processed further. At this point about 80 percent of the particles should have a screen size greater than No. 42 Tyler mesh. Preferably, the screen analysis of the flakes conforms to that given by table II to provide a product which rehydrates without pastiness or mealiness.

TABLE II

| Tyler Mesh Screen Size | Percent of Particles Retained on Screen |
| --- | --- |
| No. 20 | 61 |
| No. 42 | 22 |
| Pan | 17 |

A dried, screened product produced as described above was lightly salted and was rehydrated by adding one-half cup of boiling water to 33 grams of the flakes in a cereal bowl. The product rehydrated rapidly to produce a wheat- or farina-type breakfast cereal having a pleasing texture and mouth feel, and a flavor which was judged to be of superior quality. The rehydrated cereal was not mealy, pasty, or slimy in taste and appearance.

The product can be packaged and sold as produced by the above process or it can be combined with a number of flavoring agents to provide a convenient cook-in-the-bowl flavored product. Tables III and IV show formulations for flavored cook-in-the-bowl cereals. Normally, the flavoring agents in cereal are mixed in the dry state and packaged. The dry mixture has a moisture content of about 10 percent.

TABLE III

| Ingredient | Percent |
| --- | --- |
| Wheat Flakes | 75 |
| Dextrose | 18 |
| Apple Flavor | 4 |
| Preservatives, Salt and Spices | 3 |
| | 100 |

TABLE IV

| Ingredient | Percent |
| --- | --- |
| Wheat Flakes | 79 |
| Brown Sugar | 19 |
| Flavoring, Salt and Preservatives | 2 |
| | 100 |

I claim:

1. A method of producing an instant cook-in-the-bowl type of breakfast cereal from wheat which has a rapid rate of rehydration and convenient preparation with a taste equivalent or superior to slow-cooking breakfast cereals comprising:
   a. milling the wheat,
   b. screening the milled wheat to produce a fraction with about 80 percent of the milled wheat having a particle size between No. 12 and No. 42 Tyler mesh screen size,
   c. tempering the screened milled wheat to a moisture content of between 12 to 16 percent by weight and a temperature of 185° to 220° F.,
   d. flaking the tempered wheat to a thickness of 0.007 to 0.008 inch and,
   e. drying the flaked wheat to a moisture content of about 8 to 9 percent weight.

2. The method of claim 1 wherein about 80 percent of the flaked dried wheat has a particle size greater than No. 42 Tyler mesh screen size.

3. The method of claim 1 wherein the milled wheat is screened to produce a product having about a following particle size distribution:

| Tyler mesh screen size | Percent of Particles Retained on screen |
|---|---|
| 20 | 61 |
| 42 | 22 |
| Pan | 17 |

4. The method of claim 1 wherein vitamins and nutritional substances are added to the milled wheat.

5. The method of claim 4 wherein a nutritional supplement is wheat germ.

6. An improved instant cook-in-the-bowl-type wheat breakfast cereal having rapid rehydration, convenient preparation and the taste and consumer appeal equivalent or superior to slow-cooking breakfast cereals comprising flaked wheat particles having a particle size distribution of about 80 percent of the total product greater than No. 42 Tyler mesh screen size, the flaked particles having a moisture content between 8 and 9 percent by weight and having a flake thickness between 0.007 and 0.008 inch, said product being prepared by the method of claim 1.

7. The product of claim 6 wherein the cereal product contains vitamins, flavors and nutritional supplements.

8. The product of claim 7 containing wheat germ as a nutritional supplement.

* * * * *